United States Patent
Man

(10) Patent No.: US 9,405,952 B2
(45) Date of Patent: Aug. 2, 2016

(54) RADIO FREQUENCY IDENTIFICATION READER SYSTEM AND CONTROL METHOD THEREOF

(71) Applicant: Megasoft Technology Limited, Hong Kong (HK)

(72) Inventor: Chun Sing Matthew Man, Hong Kong (HK)

(73) Assignee: MEGASOFT TECHNOLOGY LIMITED, Hong Kong (HK)

(*) Notice: Subject to any disclaimer, the term of this patent is extended or adjusted under 35 U.S.C. 154(b) by 63 days.

(21) Appl. No.: 14/303,625

(22) Filed: Jun. 13, 2014

(65) Prior Publication Data

US 2014/0368317 A1  Dec. 18, 2014

Related U.S. Application Data

(60) Provisional application No. 61/836,174, filed on Jun. 18, 2013.

(30) Foreign Application Priority Data

Jun. 24, 2013  (CN) .......................... 2013 1 0253761

(51) Int. Cl.
*H01Q 1/22* (2006.01)
*G06K 7/10* (2006.01)

(52) U.S. Cl.
CPC ..................................... *G06K 7/109* (2013.01)

(58) Field of Classification Search
CPC ................................................... G06K 7/00
See application file for complete search history.

(56) References Cited

U.S. PATENT DOCUMENTS

| 5,818,000 A * | 10/1998 | Ma et al. ................. H01P 1/12 200/246 |
| 6,269,240 B1 * | 7/2001 | Chong ................. H01Q 1/244 455/129 |
| 2005/0156600 A1 * | 7/2005 | Olsson ..................... G01S 7/03 324/329 |
| 2005/0236480 A1 * | 10/2005 | Vrotsos ............... G06Q 20/341 235/439 |
| 2006/0125638 A1 * | 6/2006 | Marino ............... G06K 7/0008 340/572.7 |
| 2008/0018455 A1 * | 1/2008 | Kulakowski ........... G06K 7/089 340/539.11 |
| 2008/0259551 A1 * | 10/2008 | Gavenda .................. G06F 1/16 361/679.31 |
| 2012/0139690 A1 * | 6/2012 | Gupta ............... H04M 1/72569 340/5.1 |

FOREIGN PATENT DOCUMENTS

| CN | 102419811 A | 4/2012 |
| WO | 2009050488 A2 | 4/2009 |
| WO | WO 2009050488 A2 * | 4/2009 ........... G06K 7/0004 |

OTHER PUBLICATIONS

International Search Report of counterpart PCT Patent Application No. PCT/CN2014/080087 issued on Sep. 2, 2014.

* cited by examiner

*Primary Examiner* — Jennifer Mehmood
*Assistant Examiner* — Pameshanand Mahase

(57) ABSTRACT

An RFID reader system includes: a reader body; a reader module disposed in the reader body; and an antenna unit detachably installed onto the reader body. When the antenna unit is installed onto the reader body, the reader module is configured to interrogate and detect an external RFID tag through the antenna unit. A control method of the RFID reader system is also provided.

20 Claims, 8 Drawing Sheets

RADIO FREQUENCY IDENTIFICATION READER SYSTEM AND CONTROL METHOD THEREOF

CROSS-REFERENCE TO RELATED APPLICATIONS

This application claims the benefit of U.S. Provisional Patent Application No. 61/836,174 filed on Jun. 18, 2013 and Chinese Patent Application No. 201310253761.3 filed on Jun. 24, 2013; the contents of which are hereby incorporated by reference.

FIELD OF THE PATENT APPLICATION

The present patent application generally relates to radio frequency identification (RFID) technologies and more specifically to a switchable antenna RFID reader system, a RFID reader system protection method integrated with the system to protect the reader system from being damaged, and a method for item direction and location indication.

BACKGROUND

Radio-frequency identification (RFID) is the wireless non-contact use of radio-frequency electromagnetic fields to transfer data, for the purposes of automatically identifying and tracking tags attached to objects. The tags contain electronically stored information. An RFID system identifies a tag without establishing a mechanical or optical contact with the RFID tag. For different types of RFID tags in different situations, different types of RFID reader systems have been designed to be used. Hence a user may need to purchase and use multiple RFID reader systems to satisfy specific application requirements.

SUMMARY

The present patent application is directed to a RFID reader system and a control method thereof. In one aspect, the RFID reader system includes: a reader body; a reader module disposed in the reader body; an antenna unit detachably installed onto the reader body; an antenna detection switch connected with the reader module and disposed in the reader body; a protection circuit disposed in the reader body; and a control module connected with the reader module and disposed in the reader body. When the antenna unit is installed onto the reader body, the reader module is configured to interrogate and detect an external RFID tag through the antenna unit. The antenna detection switch is configured to detect whether the antenna unit is installed onto the reader body, to connect the antenna unit when finding the antenna unit is properly installed onto the reader body, and to connect the protection circuit when finding the antenna unit is not properly installed onto the reader body. The control module is configured to control the reader module to interrogate an external RFID tag in a read cycle and transmit information about the RFID tag back to the control module.

The RFID reader system may further include an antenna unit carrier. The antenna unit may be installed onto the reader body through the antenna unit carrier, and the antenna unit carrier may be slidably connected with the antenna unit.

The RFID reader system may further include a control interface and a communication module connected with the control interface. The control module may be connected with the control interface. The communication module may be connected with an external data terminal, and configured to send data to or receive data from the external data terminal. The communication module may be connected with an external processing unit, and configured to receive instructions from the external processing unit.

The RFID reader system may further include an audio and light indicator unit. The audio and light indicator unit may be connected with the control unit, and configured to indicate the location of an external RFID tag.

The RFID reader system may further include an antenna type detection circuit. The antenna unit includes an antenna type circuit, the antenna type detection circuit being configured to interact with the antenna type circuit and thereby retrieve the antenna type information.

An RFID tag may be embedded in the antenna unit, and the reader module may be configured to interrogate the RFID tag embedded in the antenna unit and thereby retrieve the antenna type information.

In another aspect, the present patent application provides an RFID reader system including: a reader body; a reader module disposed in the reader body; and an antenna unit detachably installed onto the reader body. When the antenna unit is installed onto the reader body, the reader module is configured to interrogate and detect an external RFID tag through the antenna unit.

The RFID reader system may further include an antenna unit carrier. The antenna unit may be installed onto the reader body through the antenna unit carrier, and the antenna unit carrier may be slidably connected with the antenna unit. An antenna disassembly mechanism may be disposed on the reader body and configured to control the disassembly of the antenna unit, the antenna disassembly mechanism being a button.

The RFID reader system may further include an antenna detection switch and a protection circuit both disposed in the reader body. The antenna detection switch may be connected with the reader module and configured to detect whether the antenna unit is installed onto the reader body, to connect the antenna unit when finding the antenna unit is properly installed onto the reader body, and to connect the protection circuit when finding the antenna unit is not properly installed onto the reader body.

The RFID reader system may further include a control module connected with the reader module and disposed in the reader body. The control module may be configured to control the reader module to interrogate an external RFID tag in a read cycle and transmit information about the RFID tag back to the control module. The RFID reader system may further include a control interface and a communication module connected with the control interface. The control module may be connected with the control interface. The communication module may be connected with an external data terminal, and configured to send data to or receive data from the external data terminal. The communication module may be connected with an external processing unit, and configured to receive instructions from the external processing unit.

The RFID reader system may further include an audio and light indicator unit. The audio and light indicator unit may be connected with the control unit, and configured to indicate the location of an external RFID tag.

The RFID reader system may further include an antenna type detection circuit. The antenna unit may include an antenna type circuit, the antenna type detection circuit being configured to interact with the antenna type circuit and thereby retrieve the antenna type information.

An RFID tag may be embedded in the antenna unit, and the reader module may be configured to interrogate the RFID tag embedded in the antenna unit and thereby retrieve the antenna type information.

In yet another aspect, the present patent application provides a method for controlling an RFID reader system. The RFID reader system includes a reader body; a reader module disposed in the reader body; and an antenna unit detachably installed onto the reader body. The method includes: detecting whether the antenna unit is installed onto the reader body by an antenna detection switch, the antenna detection switch being connected with the reader module; if yes, connecting the antenna detection switch to the antenna unit; and if no, connecting the antenna detection switch to a protection circuit, the protection circuit providing an internal antenna connection for protecting the reader module from being damaged.

The method may further include interrogating an external RFID tag by the reader module through the antenna unit. The antenna unit may be installed onto the reader body. The method may further include reading information from the protection circuit and sending the information back to a control module by the reader module, when the antenna unit is not installed onto the reader body, the control module being connected with the reader module.

BRIEF DESCRIPTIONS OF THE DRAWINGS

DETAILED DESCRIPTION

Reference will now be made in detail to a preferred embodiment of the radio frequency identification reader system and the control method thereof disclosed in the present patent application, examples of which are also provided in the following description. Exemplary embodiments of the system and the method disclosed in the present patent application are described in detail, although it will be apparent to those skilled in the relevant art that some features that are not particularly important to an understanding of the system and the method may not be shown for the sake of clarity.

Furthermore, it should be understood that the system and the method disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Referring to FIGS. 1A, 1B, 2A and 2B, a RFID reader system includes a reader body 1 and an antenna unit 2. The antenna unit 2 is detachably installed onto the reader body 1. The antenna unit 2 may include antennas of different types and different models, such as far field antennas, near field antennas, and etc. When required by a user, the antenna unit 2 that includes the antenna of a specific type and model may be installed onto the reader body 1. This way, the user does not need to purchase RFID reader systems of different types and models, thereby saving the cost and being able to conveniently use the RFID reader system for different purposes.

Figure 1A:
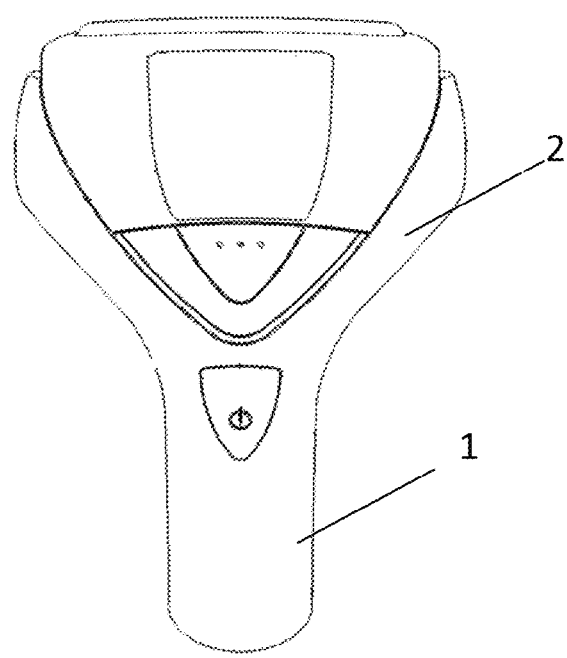
FIG. 1A is a front view of an RFID reader system in accordance with an embodiment of the present patent application.
Figure 1B:
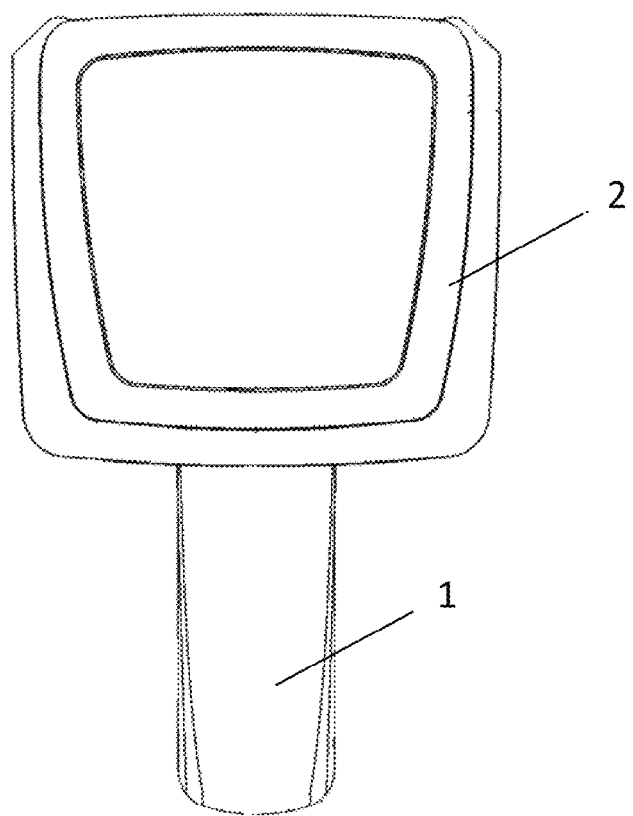
FIG. 1B is a rear view of the RFID reader system depicted in FIG. 1A.
Figure 2A:
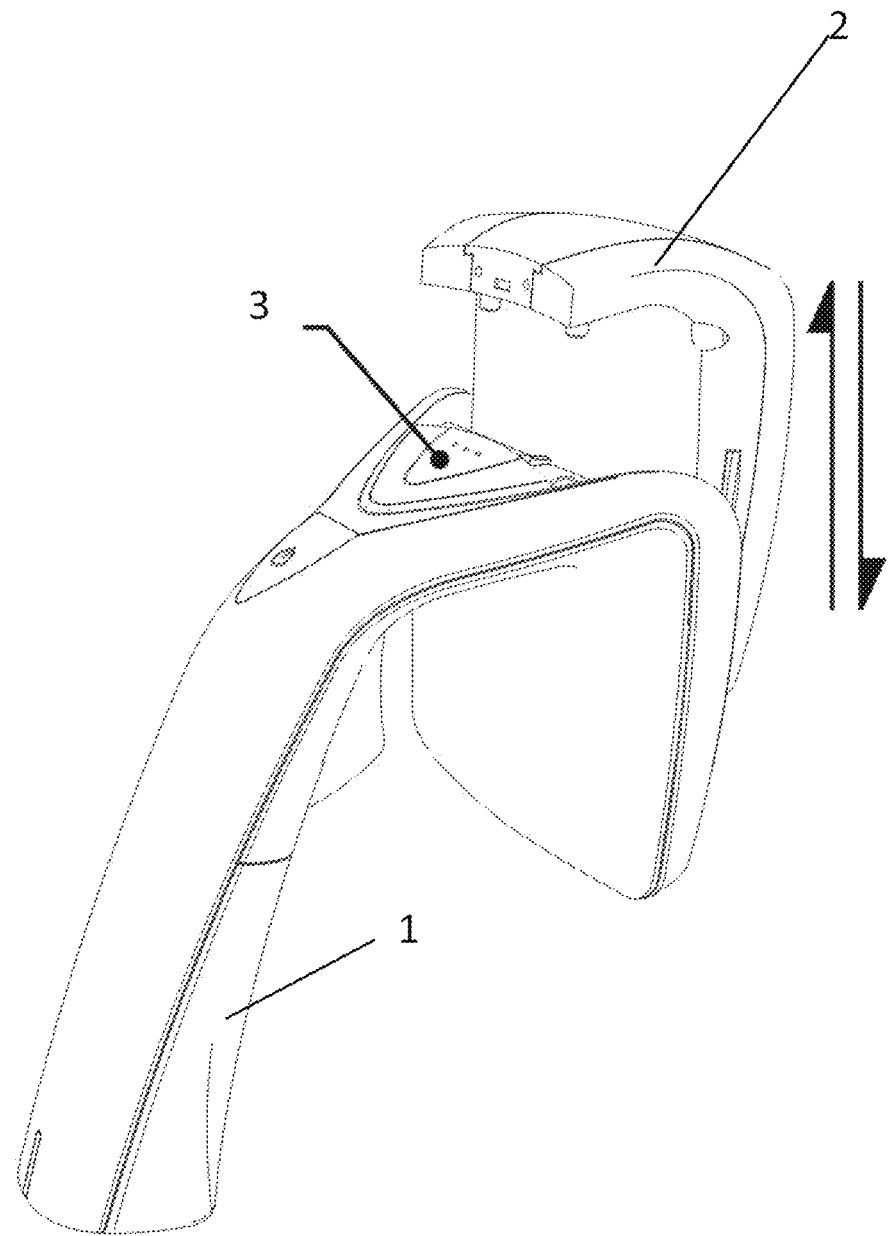
FIG. 2A illustrates an operation mode of the RFID reader system depicted in FIG. 1A.
Figure 2B:
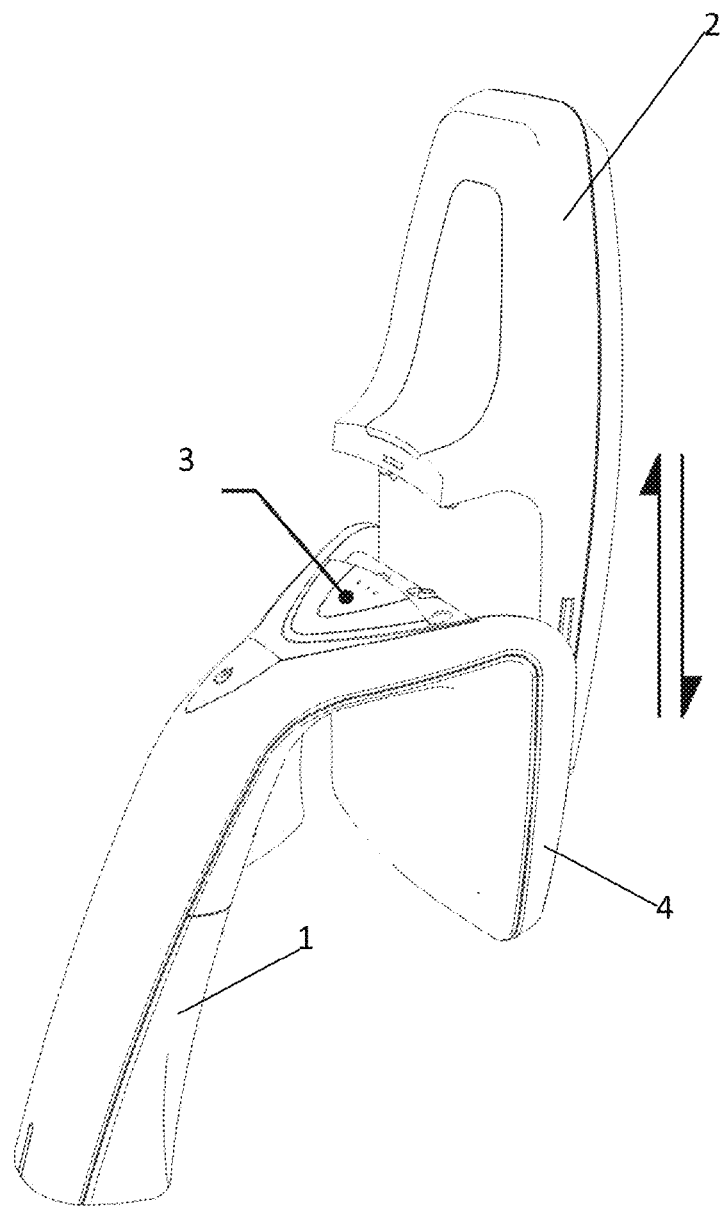
FIG. 2B illustrates another operation mode of the RFID reader system depicted in FIG. 1A.

Referring to FIGS. 2A and 2B, the RFID reader system in this embodiment further includes an antenna unit carrier 4. The antenna unit carrier 4 has a shape that is compatible with the shape of the antenna unit 2. The antenna unit 2 is installed onto the reader body 1 through the antenna unit carrier 4. The antenna unit carrier 4 may be configured corresponding to different types and models of antennas. The part where the antenna unit carrier 4 connects the reader body 1 may be designed to comply with a common standard so as to make it convenient to change the antenna unit carrier 4 from the reader body 1.

The reader body 1 (or the antenna unit carrier 4) is slidably connected with the antenna unit 2. In the embodiment illustrated by FIG. 2A and FIG. 2B, sliding grooves are defined at two sides of the antenna unit carrier 4. Sliding blocks are disposed at two sides of the antenna unit 2. The sliding blocks are configured to slide in the sliding grooves, so that it is convenient to install and uninstall the antenna unit 2 to and from the antenna unit carrier 4.

Referring to FIG. 2A and FIG. 2B, an antenna disassembly mechanism is disposed on the reader body 1 and configured to control the disassembly of the antenna unit 2. In this embodiment, the antenna disassembly mechanism is a button 3. The antenna unit 2 can be disassembled from the reader body 1 only when the button 3 is pressed and the antenna unit 2 is sliding out from the antenna unit carrier 4. Such configuration prevents the antenna unit 2 from being disassembled unintentionally. Only when the user is sure that the antenna unit 2 needs to be changed and intentionally presses the button 3, the antenna unit 2 can be disassembled, and thereby the safety of use is ensured.

Figure 3:
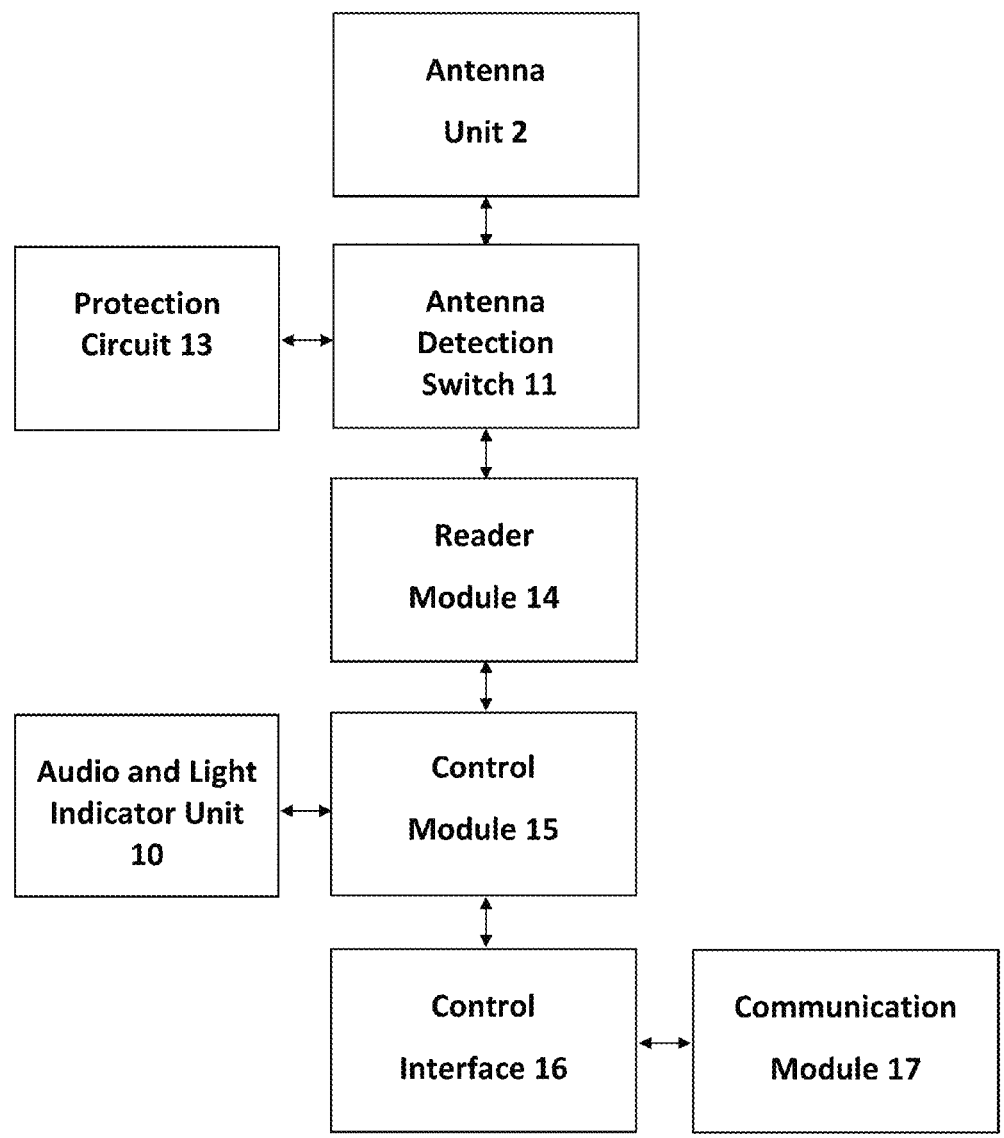
FIG. 3 is a block diagram of the RFID reader system depicted in FIG. 1A.

Referring to FIG. 3, from a circuit perspective, the RFID reader system includes an antenna unit 2, an antenna detection switch 11 that can be connected with the antenna unit 2, a protection circuit 13 that can be connected with the antenna detection switch 11, a reader module 14 connected with the antenna detection switch 11, a control module 15 connected with the reader module 14, a control interface 16 connected with the control module 15, and a communication module 17 connected with the control interface 16. The antenna unit 2 is configured to detect a context of any RFID tags in response to interrogation by the RFID reader module 14. The control module 15 includes a programmable micro-controller, and is configured to control the RFID reader module 14 with a read cycle. In response to the RFID tag's information feedback, the RFID reader module 14 is configured to query the tags in air so as to send the tag information back to the control module 15. The communication module 7 is configured to connect with an external data terminal or any processor unit, and to receive command or send/receive data to/from the RFID reader system. It is noted that in this embodiment, the antenna detection switch 11, the protection circuit 13, the reader module 14, and the control module 15 are all disposed in the reader body 1.

Figure 4:
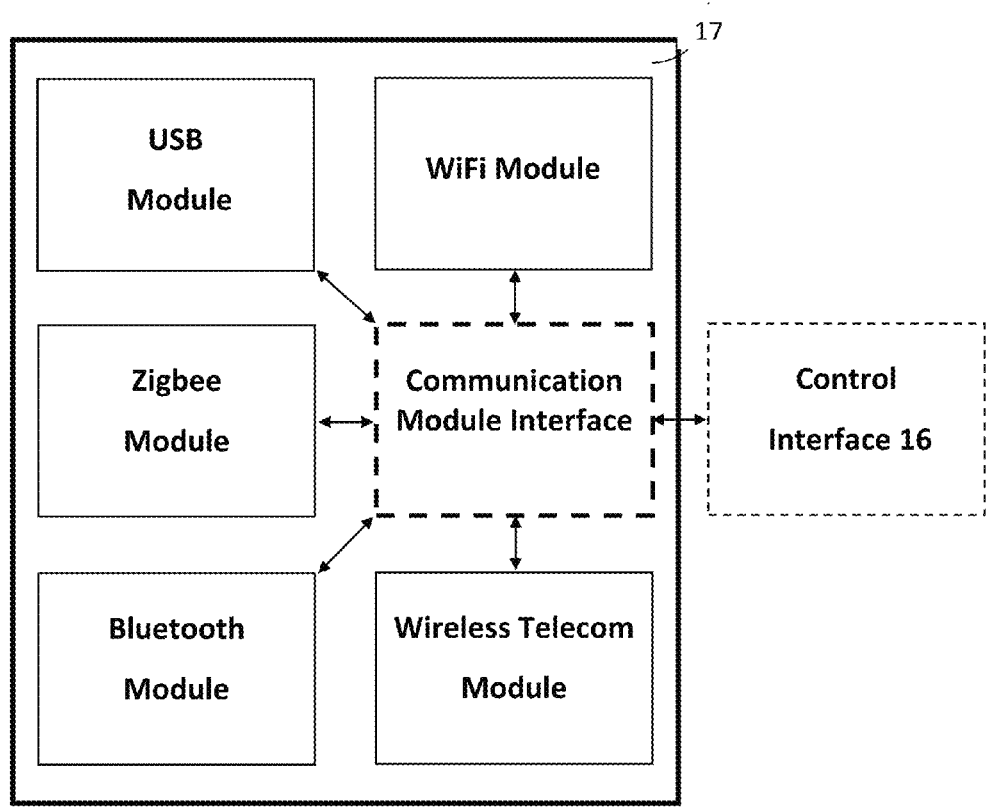
FIG. 4 is a block diagram of a communication module and a control interface of the RFID reader system depicted in FIG. 1A.

Referring to FIG. 4, the communication module 17 acts as an interface media, to provide a connection interface using Bluetooth technology, USB technology, Zigbee technology, WiFi technology or wireless telecommunication technology (such 2G, 3G, LTE or etc), linking up the switchable antenna radio frequency identification (RFID) reader system and an external unit, which may be an external data terminal or external processing unit. More specifically, the communication module 17 includes a communication module interface, a USB module, a Zigbee module, a Bluetooth module, a WiFi module and a wireless telecom module. The USB module, the Zigbee module, the Bluetooth module, the WiFi module and the wireless telecom module are connected with the communication module interface respectively.

The communication module 17 may be connected with an external data terminal, in which case, the communication module 17 is configured to send data to or receive data from the external data terminal. Alternatively, the communication module 17 may be connected with an external processing unit, in which case, the communication module 17 is configured to receive commands or instructions from the external processing unit.

In an embodiment, the RFID reader system further includes a display disposed at the reader body 1. The display is connected with the control module 15 and configured to display relevant information based on control instructions given by the control module 15. In another embodiment, the display may be external. The control module 15 controls the display to display relevant information through the control interface 16 and the communication module 17.

The antenna detection switch 11 is configured to detect whether the antenna unit 2 is installed onto the reader body 1, and connect the antenna unit 2 when finding the antenna unit 2 is properly installed onto the reader body 1. When the antenna unit 2 is installed onto (i.e. connected with) the reader body 1, the reader module 14 is configured to interrogate and detect an external RFID tag through the antenna unit 2. More specifically, the control module 15 is configured to control the reader module 14 to interrogate an external RFID tag in a read cycle, and to transmit the RFID tag information being read back to the control module 15.

The antenna detection switch 11 is configured to check whether the connection between the antenna unit 2 and the reader module 14 is well set up. If poor or no connection is found, i.e. when finding the antenna unit 2 is not properly installed onto the reader body 1, the antenna detection switch 11 is configured to connect the protection circuit 13. The protection circuit 13 provides an internal antenna connection to protect the reader module 14 from being damaged by open connection without the antenna unit 2 or poor connection with the antenna unit 2, and thereby protect the reader body 1. With the protection circuit 13, the user does not need to turn off the power source before changing the antenna unit 2 to a different type and model, so that hot switching of the antenna unit 2 of different types and models on the reader body 1 is realized. An RFID tag may be installed in the protection circuit 13. When detecting the RFID installed in the protection circuit 13, the reader module 14 is configured to send the corresponding information, such as an error message, to the control module 15, and the control module 15 is configured to control the display to display the corresponding information.

The RFID reader system may further includes an antenna type detection circuit. The antenna type detection circuit may be disposed in the control module 15, or be set up standalone and connected with the control module 15. In this embodiment, the antenna unit 2 includes an antenna type circuit. When the antenna unit 2 is installed onto the reader body 1, the antenna type detection circuit is configured to interact with the antenna type circuit and thereby retrieve the antenna type information, such as an antenna type code and an antenna model number. The control module 15 is configured to then send the display instructions to display the type information of the antenna unit 2 on the display.

In another embodiment, an RFID tag is embedded in the antenna unit 2. When the antenna unit 2 is installed onto the reader body 1, the reader module 14 is configured to interrogate the RFID tag embedded in the antenna unit 2 and thereby retrieve the antenna type information. The control module 15 is configured to then send the display instructions to display the type information of the antenna unit 2 on the display.

In above embodiments, displaying the type information of the antenna unit 2 on the display makes it convenient for the user to know the type of the antenna that the RFID reader system is currently using.

Figure 5:
FIG. 5 illustrates the RFID reader system depicted in FIG. 1A in operation.

Referring to FIG. 3 and FIG. 5, the RFID reader system further includes an audio and light indicator unit 10. The audio and light indicator unit 10 is connected with the control unit 15 and configured to indicate the location of an external RFID tag. When the RFID reader system interrogates the RFID tag, the audio and light indicator unit 10 emits audio and light signals corresponding to the location of the RFID tag to the user, thereby assisting the user to determine the location of the RFID tag.

The audio and light indicator unit 10 includes a light source and an audio source. The intensity of the light emitted by the light source, the color of the light, and the flash rate of the light may vary according to the relative location of the RFID tag. For example, the closer the RFID reader system is to the RFID tag, the greater the light intensity will be and the higher the frequency will be. The volume of the sound emitted by the audio source and the frequency of the sound may vary according to the relative location of the RFID tag. For example, the closer the RFID reader system is to the RFID tag, the louder the sound will be and the higher the frequency will be. The audio and light indicator unit 10 can thereby indicate the direction and distance of the RFID tag from the RFID reader module 14 (or the RFID reader body 1).

Referring to FIG. 5, when the reader module 14 interrogates and detects a RFID tag, the reader module 14 transmits a signal, and the RFID tag, which is in an effective detection range of the RFID reader system, receives the signal and sends a responding signal back to the reader module 14. Because the radiation beam transmitted by the antenna unit 2 is directional, the closer the RFID tag gets to the radiation beam, the stronger the responding signal that the RFID tag sends back to the reader module 14 will be. When the antenna unit 2 is installed onto the reader body 1, through changing the location of the reader body 1, the antenna unit 2 will transmit radiation beam from different angles and in different directions. Correspondingly, different RFID tags (such as RFID tags A, B and C in FIG. 5) will send different responding signals to the reader module 14. Thereby, the RFID reader system is capable of detecting the locations of the RFID tags and the locations of the items that the RFID tags are attached to.

Figure 6:
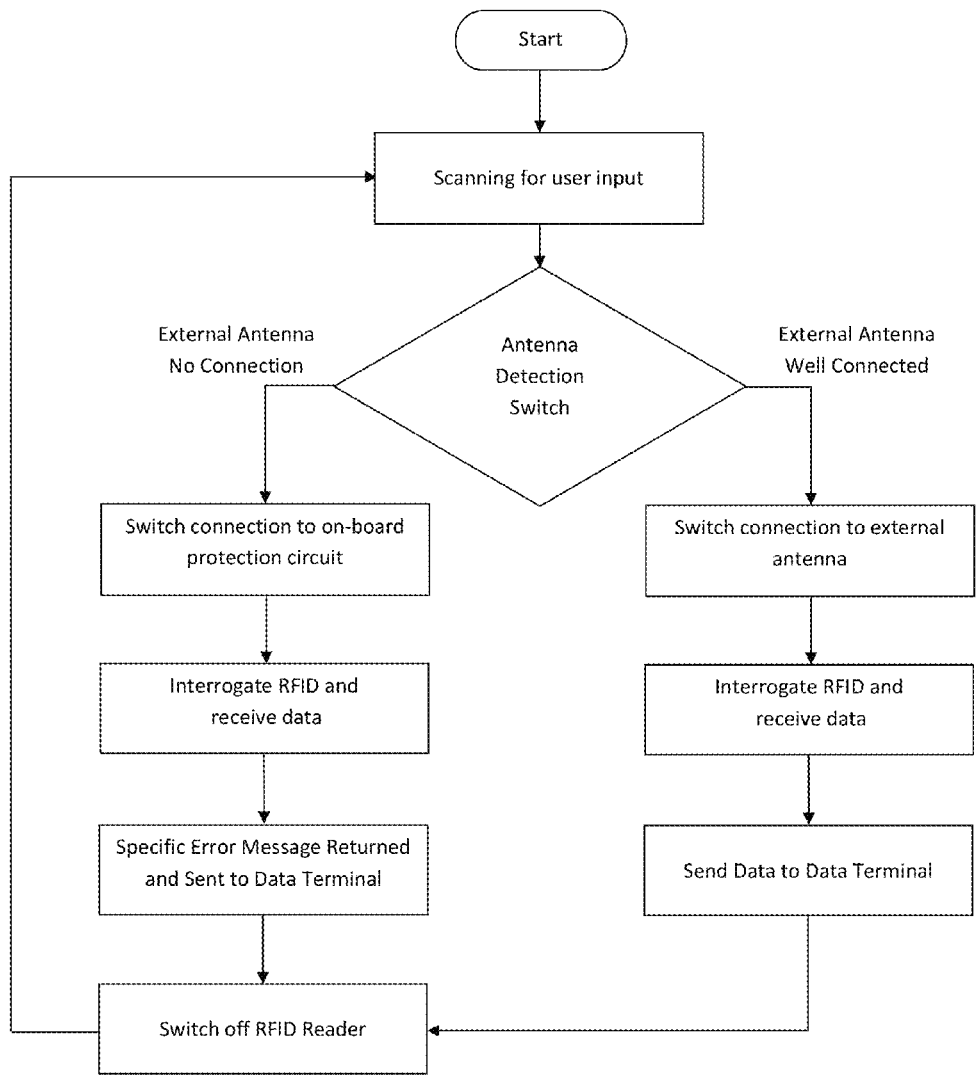
FIG. 6 is a flow chart of a method for controlling the RFID reader system depicted in FIG. 1A.

Referring to FIG. 6, a method for controlling the above-mentioned RFID reader system includes:

Step 1: the RFID system scans for user input. If there is a user input, the system starts working; if there is no user input, the system remains in a stand-by mode;

Step 2: the antenna detection switch 11 detects whether the antenna unit 2 is installed onto the reader body 1. If yes, go to step 3; if no, go to step 4;

Step 3: the antenna unit 2 is installed onto the reader body 1; the antenna detection switch 11 is connected to the antenna unit 2; the reader module interrogates the external RFID tag through the antenna unit 2; the reader module 14 receives tag information and send the tag information back to the control module 15; the control module processes the information, for example sending the tag information to an external data terminal; after the processing, go to step 5;

Step 4: the antenna unit 2 is not installed onto the reader body 1; the antenna detection switch 11 is connected to the protection circuit 13; the reader module 14 reads information from the protection circuit 13 and sends the information back to the control module 15; the control module 15 receives a specific error message and may control the error message to be sent to an external data terminal; go to step 5; and Step 5: the control module 15 controls the reader body 1 to be switched off; go to step 1 again.

While the present patent application has been shown and described with particular references to a number of embodiments thereof, it should be noted that various other changes or modifications may be made without departing from the scope of the present invention.

What is claimed is:

1. A RFID reader system comprising:
a reader body;
a reader module disposed in the reader body;
an antenna unit detachably installed onto the reader body;
an antenna detection switch connected with the reader module and disposed in the reader body;
a protection circuit disposed in the reader body; and
a control module connected with the reader module and disposed in the reader body; wherein:
when the antenna unit is installed onto the reader body, the reader module is configured to interrogate and detect an external RFID tag through the antenna unit;
the antenna detection switch is configured to detect whether the antenna unit is installed onto the reader body, to connect the antenna unit when finding the antenna unit is properly installed onto the reader body, and to connect the protection circuit when finding the antenna unit is not properly installed onto the reader body;
the control module is configured to control the reader module to interrogate an external RFID tag in a read cycle and transmit information about the RFID tag back to the control module; and
the protection circuit is configured to provide an internal antenna connection to protect the reader module from being damaged and provide a hot switching of the antenna unit.

2. The RFID reader system of claim 1 further comprising an antenna unit carrier, wherein the antenna unit is installed onto the reader body through the antenna unit carrier, and the antenna unit carrier is slidably connected with the antenna unit;
wherein an antenna disassembly mechanism is disposed on the reader body and configured to control the disassembly of the antenna unit, the antenna disassembly mechanism being a button; and
sliding grooves are defined at two sides of the antenna unit carrier and sliding blocks are disposed at two sides of the antenna unit the sliding blocks are configured to slide in the sliding grooves and be disassembled from the sliding grooves when the button is pressed.

3. The RFID reader system of claim 1 further comprising a control interface and a communication module connected with the control interface, wherein the control module is connected with the control interface.

4. The RFID reader system of claim 3, wherein the communication module is connected with an external data terminal, and configured to send data to or receive data from the external data terminal; or the communication module is connected with an external processing unit, and configured to receive instructions from the external processing unit.

5. The RFID reader system of claim 3 further comprising an audio and light indicator unit, wherein the audio and light indicator unit is connected with the control unit, and configured to indicate the location of an external RFID tag.

6. The RFID reader system of claim 1 further comprising an antenna type detection circuit, wherein the antenna unit comprises an antenna type circuit, the antenna type detection circuit being configured to interact with the antenna type circuit and thereby retrieve the antenna type information.

7. The RFID reader system of claim 1, wherein an RFID tag is embedded in the antenna unit, and the reader module is configured to interrogate the RFID tag embedded in the antenna unit and thereby retrieve the antenna type information.

8. The RFID reader system of claim 1, wherein an RFID tag are installed in the protection circuit, when detecting the RFID tag installed in the protection circuit, the reader module is configured to send corresponding information to the control module, and the control module is configured to control a display to display the corresponding information.

9. An RFID reader system comprising:
a reader body;
a reader module disposed in the reader body; and
an antenna unit detachably installed onto the reader body; wherein:
when the antenna unit is installed onto the reader body, the reader module is configured to interrogate and detect an external RFID tag through the antenna unit;
the RFID reader system further comprises an antenna detection switch and a protection circuit both disposed in the reader body,
the antenna detection switch is connected with the reader module and configured to detect whether the antenna unit is installed onto the reader body, to connect the antenna unit when finding the antenna unit is properly installed onto the reader body, and to connect the protection circuit when finding the antenna unit is not properly installed onto the reader body; and
the protection circuit is configured to provide an internal antenna connection to protect the reader module from being damaged and provide a hot switching of the antenna unit.

10. The RFID reader system of claim 9 further comprising an antenna unit carrier, wherein the antenna unit is installed onto the reader body through the antenna unit carrier, and the antenna unit carrier is slidably connected with the antenna unit;
wherein an antenna disassembly mechanism is disposed on the reader body and configured to control the disassembly of the antenna unit, the antenna disassembly mechanism being a button; and
sliding grooves are defined at two sides of the antenna unit carrier and sliding blocks are disposed at two sides of the antenna unit the sliding blocks are configured to slide in the sliding grooves and be disassembled from the sliding grooves when the button is pressed.

11. The RFID reader system of claim 9 further comprising a control module connected with the reader module and disposed in the reader body, wherein the control module is configured to control the reader module to interrogate an external RFID tag in a read cycle and transmit information about the RFID tag back to the control module.

12. The RFID reader system of claim 11 further comprising a control interface and a communication module connected with the control interface, wherein the control module is connected with the control interface.

13. The RFID reader system of claim 12, wherein the communication module is connected with an external data terminal, and configured to send data to or receive data from the external data terminal; or the communication module is connected with an external processing unit, and configured to receive instructions from the external processing unit.

14. The RFID reader system of claim 12 further comprising an audio and light indicator unit, wherein the audio and light indicator unit is connected with the control unit, and configured to indicate the location of an external RFID tag.

15. The RFID reader system of claim 9 further comprising an antenna type detection circuit, wherein the antenna unit comprises an antenna type circuit, the antenna type detection circuit being configured to interact with the antenna type circuit and thereby retrieve the antenna type information.

16. The RFID reader system of claim 9, wherein an RFID tag is embedded in the antenna unit, and the reader module is configured to interrogate the RFID tag embedded in the antenna unit and thereby retrieve the antenna type information.

17. The RFID reader system of claim 9, wherein an RFID tag are installed in the protection circuit, when detecting the RFID tag installed in the protection circuit, the reader module is configured to send corresponding information to the control module, and the control module is configured to control a display to display the corresponding information.

18. A method for controlling an RFID reader system, the RFID reader system comprising a reader body; a reader module disposed in the reader body; and an antenna unit detachably installed onto the reader body; the method comprising:
    detecting whether the antenna unit is installed onto the reader body by an antenna detection switch, the antenna detection switch being connected with the reader module;
    if yes, connecting the antenna detection switch to the antenna unit; and
    if no, connecting the antenna detection switch to a protection circuit, the protection circuit providing an internal antenna connection for protecting the reader module from being damaged and providing a hot switching of the antenna unit.

19. The method of claim 18 further comprising interrogating an external RFID tag by the reader module through the antenna unit, when the antenna unit is installed onto the reader body.

20. The method of claim 18 further comprising reading information from the protection circuit and sending the information back to a control module by the reader module, when the antenna unit is not installed onto the reader body, the control module being connected with the reader module.

* * * * *